United States Patent
Farn et al.

(10) Patent No.: US 9,311,652 B2
(45) Date of Patent: Apr. 12, 2016

(54) METHOD, APPARATUS AND SYSTEM FOR GENERATING AND VERIFYING COLOR BARCODE

(71) Applicant: Industrial Technology Research Institute, Hsinchu (TW)

(72) Inventors: En-Jung Farn, Hsinchu (TW); You-Lin Chen, Changhua (TW); Chih-Wei Chen, New Taipei (TW); Nien-Chu Wu, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/280,675

(22) Filed: May 19, 2014

(65) Prior Publication Data

US 2015/0120423 A1    Apr. 30, 2015

Related U.S. Application Data

(60) Provisional application No. 61/897,229, filed on Oct. 30, 2013.

(30) Foreign Application Priority Data

Dec. 20, 2013 (TW) .............. 102147591 A (51) Int. Cl.
G06Q 30/02 (2012.01)
G06K 19/06 (2006.01)
(Continued)

(52) U.S. Cl.
CPC .............. *G06Q 30/0225* (2013.01); *G06K 7/12* (2013.01); *G06K 7/1417* (2013.01); *G06K 19/0614* (2013.01); *G06K 7/1452* (2013.01); *G06K 19/06037* (2013.01); *G06K 19/10* (2013.01)

(58) Field of Classification Search
CPC ............ G06Q 30/0225; G06K 7/1452; G06K 19/0614; G06K 7/12; G06K 7/1417; G06K 19/06037; G06K 19/10
See application file for complete search history.

(56) References Cited

U.S. PATENT DOCUMENTS 7,025,269 B2   4/2006   Marshall
8,297,510 B1   10/2012  Yakshtes et al.
(Continued)

FOREIGN PATENT DOCUMENTS

CN   1878057     12/2006
CN   102467731   5/2012
(Continued)

OTHER PUBLICATIONS

Prashan Premaratne, et al., "2D barcodes as watermarks in image authentication," 6th IEEE/ACIS International Conference on Computer and Information Science (ICIS 2007), Jul. 2007, pp. 432-437.
(Continued)

*Primary Examiner* — Sonji Johnson
(74) *Attorney, Agent, or Firm* — Jianq Chyun IP Office (57) ABSTRACT

A method, an apparatus, and a system for generating and verifying a color barcode are provided. The method for verifying the color barcode is adapted to an electronic apparatus to execute verification with use of a color barcode certificate. In the method, direction information of a plurality of boundaries among a plurality of serially connected symbolic elements in the color barcode certificate is read to retrieve first authentication information of a first party. Each of the symbolic elements is one of at least two polygons, and colors of adjacent symbolic elements are different. Color information of the symbolic elements is then read to retrieve second authentication information of a second party. An identity of a holder of the color barcode certificate is verified according to the first authentication information and the second authentication information.

21 Claims, 7 Drawing Sheets

(51) Int. Cl.
*G06K 7/12* (2006.01)
*G06K 7/14* (2006.01)
*G06K 19/10* (2006.01)

(56) References Cited

U.S. PATENT DOCUMENTS

| | | | |
|---|---|---|---|
| 8,379,261 | B2 | 2/2013 | Ming |
| 8,430,301 | B2 | 4/2013 | Tian et al. |
| 8,702,011 | B2 | 4/2014 | Farn et al. |
| 2006/0097062 | A1* | 5/2006 | Cheong et al. ............ 235/494 |
| 2012/0330845 | A1 | 12/2012 | Kang |

FOREIGN PATENT DOCUMENTS

| | | |
|---|---|---|
| TW | I230906 | 4/2005 |
| TW | 200949719 | 12/2009 |
| TW | I349223 | 9/2011 |
| TW | 201211900 | 3/2012 |
| TW | I399963 | 6/2013 |
| TW | 201339975 | 10/2013 |
| WO | 2013109276 | 7/2013 |

OTHER PUBLICATIONS

Jerry Zeyu Gao, et al., "Understanding 2D-Barcode Technology and Applications in M-Commerce—Design and Implementation of a 2D Barcode Processing Solution," 31st Annual Computer Software and Applications Conference (COMPSAC 2007), vol. 2, Jul. 2007, pp. 49-56.

Guenther Starnberger, et al., "QR-TAN: Secure Mobile Transaction Authentication," 2009 International Conference on Availability, Reliability and Security, Mar. 2009, pp. 578-583.

Jerry Gao, et al., "A 2D Barcode-Based Mobile Payment System," 2009 Third International Conference on Multimedia and Ubiquitous Engineering, Jun. 2009, pp. 320-329.

Young Sil Lee, et al., "Online Banking Authentication System using Mobile-OTP with QR-code," 5th International Conference on Computer Sciences and Convergence Information Technology (ICCIT 2010), Dec. 2010, pp. 644-648.

"Office Action of Taiwan Counterpart Application", issued on Jul. 31, 2015, p. 1-p. 3, in which the listed references were cited.

* cited by examiner

| Authentication information of party A | | | |
|---|---|---|---|
| Confidential information of party A | 00...0 | Reed–Solomon error correction code | Padding information (or assistant information) |
| 102 | 104 | 106 | 108 |

FIG. 15

METHOD, APPARATUS AND SYSTEM FOR GENERATING AND VERIFYING COLOR BARCODE

CROSS-REFERENCE TO RELATED APPLICATION

This application claims the priority benefits of U.S. provisional application Ser. No. 61/897,229, filed on Oct. 30, 2013 and Taiwan application serial no. 102147591, filed on Dec. 20, 2013. The entirety of each of the above-mentioned patent applications is hereby incorporated by reference herein and made a part of this specification.

BACKGROUND OF THE INVENTION

1. Technical Field

The technical field relates to a method, an apparatus, and a system for generating and verifying a color barcode.

2. Background

Different business sectors that establish strategic alliance with each other or one another have been employing barcodes as a means for authentication. Due to security concerns, the barcodes are often applied to free/rebate coupons or certificates, such as one-dimensional (1D) barcode cross-business coupons or certificates that are printed after users withdraw money from an automated teller machine (ATM) owned by a bank or given to customers by convenience stores after purchase. The barcode verification is done by verifying certain codes through network and backstage. When being applied to a costly certificate, the barcode is required to be printed on paper with printed after users withdraw money from an automated teller machine (ATM) owned by a bank or given to customers by convenience stores after purchase. The barcode verification is done by verifying certain codes through network and backstage. When being applied to a costly certificate, the barcode is required to be printed on paper with special patterns, e.g., a Taiwan High Speed Rail (THSR) ticket sold by 7-11 (a well-known convenience store) on a commission basis. This is because the existing two-dimensional (2D) barcode is in a form of single encoding, and if two different confidential information (e.g., from two different parties A and B of a strategic alliance) are intended to be included in the same barcode, the two parties A and B should together establish a common encoding protocol that regulates the length of field used for recording the confidential information of both parties, 2D barcode mask, and the rules of using error correction codes, etc. In addition, given that the party A intends to collaborate with different parties for the same product made by the party A, different common encoding protocols are required to be established. To ensure mutual interests of both parties, an impartial third party is often required to establish such a common encoding protocol.

In view of the above, it is necessary to provide a barcode simultaneously having two kinds of encoding formats, such that two parties in different sectors are able to store mutual confidential information into the barcode without further negotiation. As a result, the party A is able to collaborate with different parties B for one product made by the party A under one single verification mechanism.

SUMMARY

In the disclosure, a method, an apparatus, and a system for generating and verifying a color barcode are provided, in which a color barcode is used to store confidential information of two parties in different sectors, so as to resolve current issues derived from the cross-business use of coupons or certificates.

According to an exemplary embodiment of the disclosure, a method for verifying a color barcode is adapted to an electronic apparatus to execute verification with use of a color barcode certificate. In the method, direction information of a plurality of boundaries among a plurality of serially connected symbolic elements in the color barcode certificate is read to retrieve first authentication information of a first party. Each of the symbolic elements is one of at least two polygons, and colors of adjacent symbolic elements are different. Color information of the symbolic elements is then read to retrieve second authentication information of a second party. An identity of a holder of the color barcode certificate is verified according to the first authentication information and the second authentication information.

According to an exemplary embodiment of the disclosure, a method for generating a color barcode is adapted to an electronic apparatus to generate a color barcode certificate for authentication. In the method, first authentication information of a first party is encoded to generate a barcode certificate sample constituted by a plurality of serially connected symbolic elements. Each of the symbolic elements is one of at least two polygons, and the first authentication information is recorded in direction information of a plurality of boundaries among the symbolic elements in the color barcode certificate. Second authentication information of a second party is encoded in the symbolic elements of the barcode certificate sample to generate the color barcode certificate constituted by the symbolic elements. Colors of the adjacent symbolic elements are different, and the second authentication information is recorded in color information of the symbolic elements.

According to an exemplary embodiment of the disclosure, a color barcode generator includes a boundary direction encoding module and a symbol color encoding module. The boundary direction encoding module encodes first authentication information of a first party to generate a barcode certificate sample constituted by a plurality of serially connected symbolic elements. Each of the symbolic elements is one of at least two polygons, and the first authentication information is recorded in direction information of a plurality of boundaries among the symbolic elements. The symbol color encoding module encodes second authentication information of a second party in the symbolic elements of the barcode certificate sample to generate a color barcode certificate constituted by the symbolic elements. Colors of the adjacent symbolic elements are different, and the second authentication information is recorded in color information of the symbolic elements.

According to an exemplary embodiment of the disclosure, a color barcode reader includes a boundary direction reading module, a symbol color reading module, and an identity verification module. The boundary direction reading module reads direction information of a plurality of boundaries among a plurality of serially connected symbolic elements in a color barcode certificate to retrieve first authentication information of a first party. Each of the symbolic elements is one of at least two polygons. The symbol color reading module reads color information of the symbolic elements to retrieve second authentication information of a second party. The identity verification module verifies an identity of a holder of the color barcode certificate according to the first authentication information and the second authentication information.

According to an exemplary embodiment of the disclosure, a color barcode verification system includes a color barcode generator and a color barcode reader. The color barcode generator includes a boundary direction encoding module and a symbol color encoding module. The boundary direction encoding module encodes first authentication information of a first party to generate a barcode certificate sample constituted by a plurality of serially connected symbolic elements. Each of the symbolic elements is one of at least two polygons, and the first authentication information is recorded in direction information of a plurality of boundaries among the symbolic elements. The symbol color encoding module encodes second authentication information of a second party in the symbolic elements of the barcode certificate sample to generate a color barcode certificate constituted by the symbolic elements. Colors of the adjacent symbolic elements are different, and the second authentication information is recorded in color information of the symbolic elements. The color barcode reader includes a boundary direction reading module, a symbol color reading module, and an identity verification module. The boundary direction reading module reads the direction information of the boundaries among the serially connected symbolic elements in the color barcode certificate to retrieve the first authentication information of the first party. The symbol color reading module reads color information of the symbolic elements to retrieve the second authentication information of the second party. The identity verification module verifies an identity of a holder of the color barcode certificate according to the first authentication information and the second authentication information.

In view of the method, the apparatus, and the system for generating and verifying the color barcode described above, triangles and parallelograms are employed as the symbolic elements to generate the color barcode certificate, and the color information of the symbolic elements and the direction information of the boundaries among the symbolic elements are applied to store the confidential information from two allied parties in different business sectors. With the corresponding verification mechanism, the coupons or certificates for the same product may be used in various cross-business stores having strategic alliance.

Several exemplary embodiments accompanied with figures are described below to further describe the disclosure in details.

BRIEF DESCRIPTION OF DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In an exemplary embodiment of the disclosure, a method for generating and verifying a color barcode is provided. In the method, color information is included in a barcode to increase the capacity of the barcode, and the color barcode may serve as an authentication certificate. To encode the color barcode, triangles and parallelograms are employed as the symbolic elements, and directions of boundaries among the symbolic elements may be encoded in a certain scheme to store data. Besides, through another encoding scheme, the symbolic elements may be given with colors to store data. The two encoding schemes may be independent from each other and may have different error correction rates, such that different confidential information may be stored, respectively, and the barcode simultaneously having two kinds of encoding formats may be provided to two allied parties in different sectors.

According to the disclosure, the barcodes are mainly applied to the cross-business use of coupons or certificates, and therefore it is assumed that the two allied parties in different sectors are A and B. The party A provides items in exchange of the coupons or certificates, and the party B provides the coupons or certificates for the consumers. From the perspective of consumers, the party A is the store where the consumers may use the coupons or certificates, and the party B is the store where the consumers obtain the coupons or certificates.

Four sections, i.e., the principle of encoding the color barcode, the format of a color barcode certificate, the structure of a color barcode verification system, and the verification process including steps of generating and verifying the color barcode certificate, are provided hereinafter to explain the disclosure.

Figure 1:
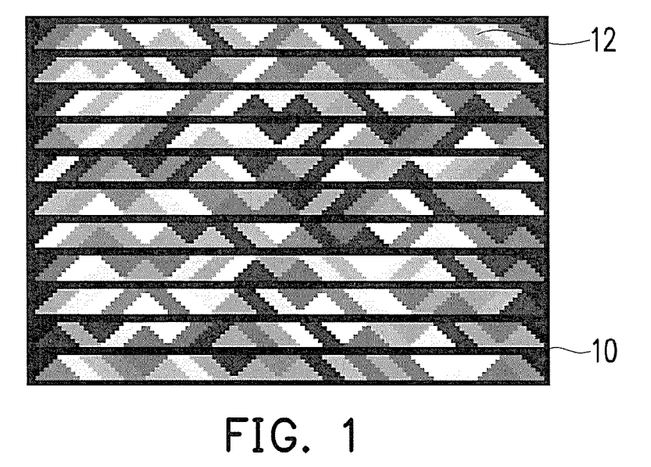
FIG. 1 illustrates an exemplary color barcode according to an exemplary embodiment of the disclosure.
Figure 2:
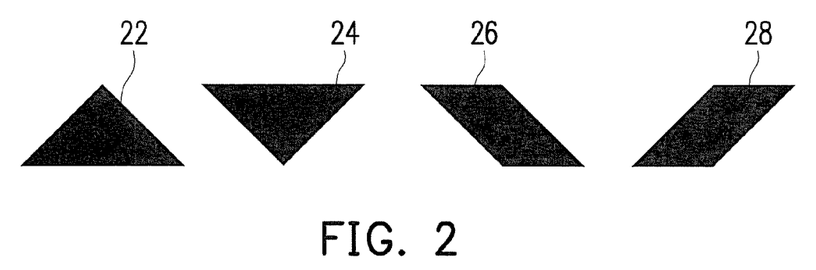
FIG. 2 illustrates four exemplary symbolic elements in a color barcode according to an exemplary embodiment of the disclosure.

FIG. 1 illustrates an exemplary color barcode according to an exemplary embodiment of the disclosure. With reference to FIG. 1, the color barcode 10 described in the present exemplary embodiment has 8 colors, wherein the black color is employed as partitions and separation lines, while the other 7 colors are applied to store information. Besides, the color barcode 10 provided herein includes 11 symbolic element rows 12, and triangles and parallelograms are employed as the symbolic elements in the symbolic element rows 12. For instance, FIG. 2 illustrates four kinds of symbolic elements in the color barcode 10, and the four kinds of symbolic elements include a triangle 22, an upside-down triangle 24, a parallelogram 26 (tilting toward the left), and a parallelogram 28 (tilting toward the right).

Figure 3:
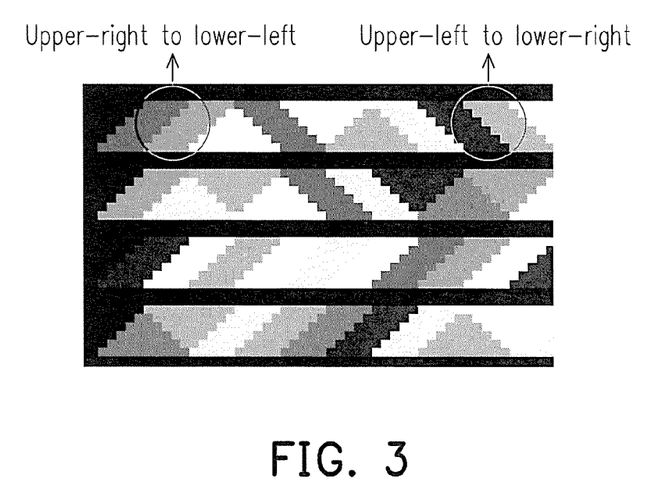
FIG. 3 illustrates exemplary directions of boundaries among symbolic elements according to an exemplary embodiment of the disclosure.

While the four kinds of symbolic elements are applied, boundaries among the symbolic elements may have two different directions: upper-left to lower-right and upper-right to lower-left, as shown in FIG. 3, and thus the directions of boundaries may serve to store one bit. It is assumed that N colors are applied to generate the color barcode; since one of the N colors (e.g., the black color shown in FIG. 1) is independent from the other colors and serves as partitions or separation lines, and colors of the adjacent symbolic elements cannot be the same, each symbolic element may have one of (N−2) colors.

Figure 4:
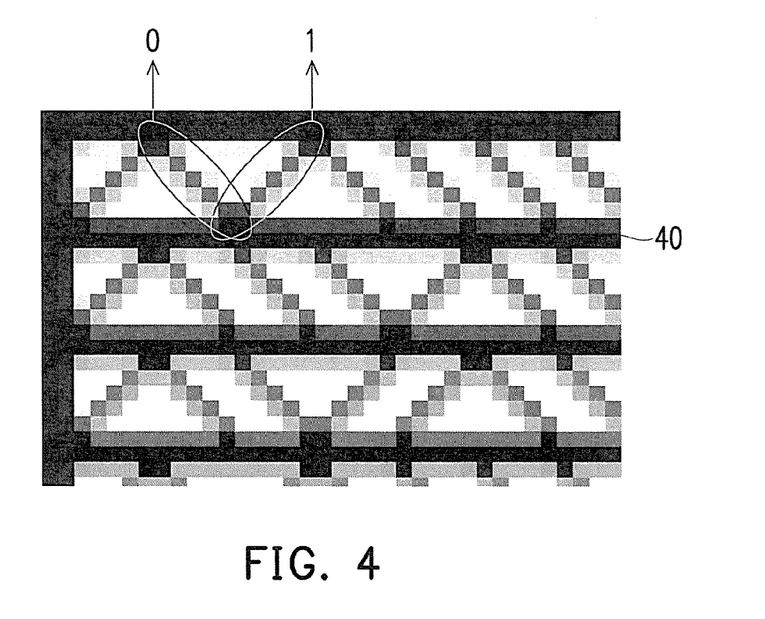
FIG. 4 schematically illustrates a color barcode where data are stored according to an exemplary embodiment of the disclosure.

In the disclosure, the directions of boundaries and the colors are two independent encoding formats. As to the directions of boundaries, the boundary between two symbolic elements acts as one unit, and each boundary stores one bit of data. The order of storing the data into the symbolic element rows in the color barcode is from left to right and from top to bottom. For instance, FIG. 4 schematically illustrates a color barcode where data are stored according to an exemplary embodiment of the disclosure. With reference to FIG. 4, in the present exemplary embodiment, 0 is stored in a direction from the upper left to the lower right, and 1 is stored in a direction from the upper right to the lower left; thereby, the foremost two bits of data in the color barcode 40 are 0 and 1.

As to the colors, two symbolic elements act as one unit, and $\log((N-2)^2)$ bits of data may be stored in the color information of each set of two symbolic elements. A color information look-up table is built in unit of two different colors according to the colors actually used, and it is assumed that the 8 colors that are used are red, green, blue, magenta, yellow, light blue, white, and black. The black color is the frame color and does not serve to store data, and the color information look-up table (i.e., Table 1) may be established according to the other 7 colors:

TABLE 1

| | | | | | |
|---|---|---|---|---|---|
| red\green | red\blue | red\magenta | red\yellow | red\light blue | red\white |
| green\red | green\blue | green\magenta | green\yellow | green\light blue | green\white |
| blue\red | blue\green | blue\magenta | blue\yellow | blue\light blue | blue\white |
| magenta\red | magenta\green | magenta\blue | magenta\yellow | magenta\light blue | magenta\white |
| yellow\red | yellow\green | yellow\blue | yellow\magenta | yellow\light blue | yellow\white |
| light blue\red | light blue\green | light blue\blue | light blue\magenta | light blue\yellow | light blue\white |
| white\red | white\green | white\blue | white\magenta | white\yellow | white\light blue |

Figure 5:
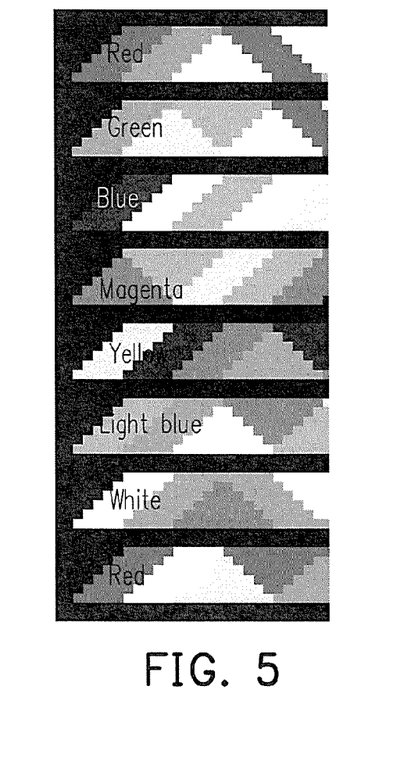
FIG. 5 illustrates exemplary reference symbolic elements in a color barcode according to an exemplary embodiment of the disclosure.

In each symbolic element row in the color barcode, the leftmost symbolic element may be set as the reference symbolic element, and the colors of the reference symbolic elements from the top to the bottom may be red, green, blue, magenta, yellow, light blue, white, red, . . . (as shown in FIG. 5), which should however not be construed as a limitation to the disclosure. The order of encoding the symbolic elements in each symbolic row is from left to right in unit of two symbolic elements, and the encoding step starts from the second left symbolic element in each row.

Figure 6:
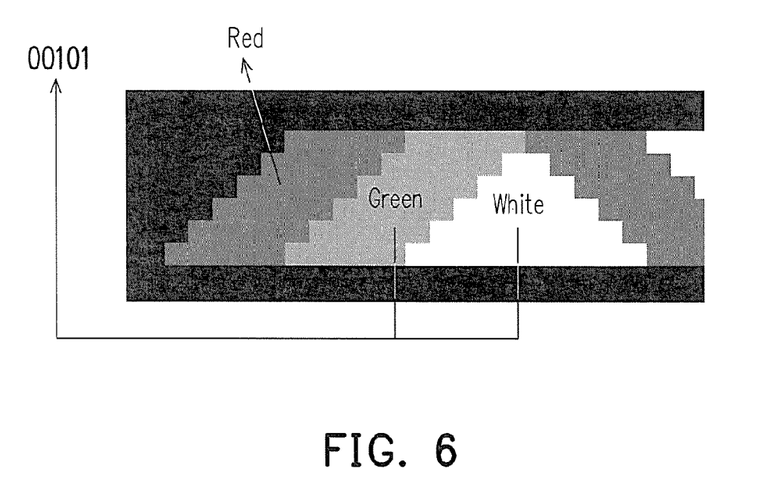
FIG. 6 illustrates an exemplary color look-up table to determine colors of the symbolic elements according to an exemplary embodiment of the disclosure.

Since the number of the used colors is 8, the data that can be stored in two symbolic elements are $\log((8-2)^2)=5.169$, and the rounded figure is 5 (bits of data). The color information look-up table is revised according to the color of the symbolic element on the leftmost symbolic element, and the location of the second left symbolic element in the first symbolic element row is taken for example. The color of the leftmost symbolic element in the first symbolic element row is a reference color and is red, as shown in FIG. 6, and therefore the column of red/(another color) in Table 1 is removed, and $00000_2$ to $11111_2$ are filled in the revised color information look-up table. The remaining four sets of colors won't be used in the encoding process, and accordingly the following Table 2 may be established:

TABLE 2

| | | | | | |
|---|---|---|---|---|---|
| green\red | green\blue | green\magenta | green\yellow | green\light blue | green\white |
| $00000_2$ | $00001_2$ | $00010_2$ | $00011_2$ | $00100_2$ | $00101_2$ |
| blue\red | blue\green | blue\magenta | blue\yellow | blue\light blue | blue\white |
| $00110_2$ | $00111_2$ | $01000_2$ | $01001_2$ | $01010_2$ | $01011_2$ |

TABLE 2-continued

| magenta\red 01100$_2$ | magenta\green 01101$_2$ | magenta\blue 01110$_2$ | magenta\yellow 01111$_2$ | magenta\light blue 10000$_2$ | magenta\white 10001$_2$ |
|---|---|---|---|---|---|
| yellow\red 10010$_2$ | yellow\green 10011$_2$ | yellow\blue 10100$_2$ | yellow\magenta 10101$_2$ | yellow\light blue 10110$_2$ | yellow\white 10111$_2$ |
| light blue\v 11000$_2$ | light blue\green 11001$_2$ | light blue\blue 11010$_2$ | light blue\magenta 11011$_2$ | light blue\yellow 11100$_2$ | light blue\white 11101$_2$ |
| white\red 11110$_2$ | white\green 11111$_2$ | white\blue | white\magenta | white\yellow | white\light blue |

Given that 5 bits of data obtained from the encoding information are 00101$_2$, the corresponding color of 00101$_2$ is green\white according to Table 1, and the set of the symbolic elements shown in FIG. 6 has the color of green\white.

It should be mentioned that the capacity of the color barcode may have different combinations and is determined according to the number of the symbolic element rows and the number of the symbolic elements in each symbolic element row. The number of storable bits also has a fixed value. The storage capacity calculated by means of the directions of boundaries and the colors is expressed by the following equations:

Number of bits stored by boundary directions=Number of the symbolic element rows×Number of boundaries among the symbolic elements in each symbolic element row;   (1)

Number of bits stored by colors=Number of the symbolic element rows×Number of color sets in each symbolic element row×(log(Number of used colors−2)$^2$)   (2).

The number of bits that can be stored through either one of the two encoding formats is fixed. The data encoded by means of boundary directions may include three parts: confidential information of the party A, the error correction code, and the padding information for padding the insufficient length or the non-confidential assistant information; the data encoded by means of colors may include four parts: non-confidential information, the confidential information of the party B, the error correction code, and the padding information for padding the insufficient length. The number of bits in each part is fixed. Here, the length of the error correction code is determined by the fault-tolerance rates respectively set according to the two encoding formats. Since errors are less likely to occur when reading the directions of boundaries than reading the colors, the fault-tolerance rate of the encoding step according to the boundary directions may be set as 5%, and the fault-tolerance rate of the encoding step according to the colors may be set as 15%. Said rates are merely exemplary and should not be construed as limitations to the disclosure.

Figure 7:
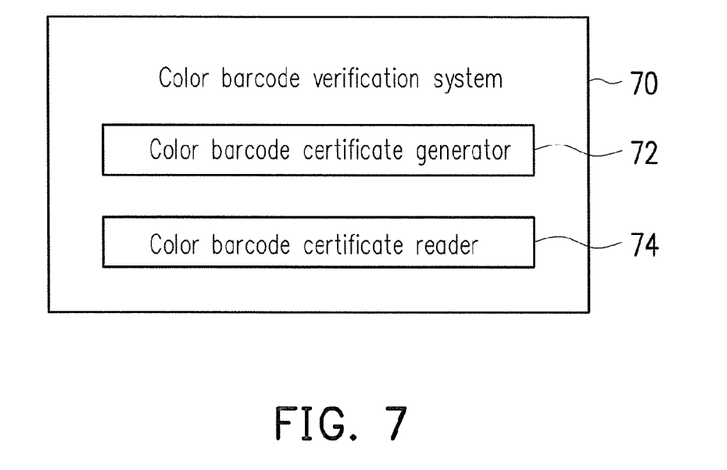
FIG. 7 is a block view illustrating a color barcode verification system according to an exemplary embodiment of the disclosure.

FIG. 7 is a block view illustrating a color barcode verification system according to an exemplary embodiment of the disclosure. With reference to FIG. 7, the color barcode verification system 70 described in the present exemplary embodiment includes a color barcode certificate generator 72 and a color barcode certificate reader 74. In the present exemplary embodiment, the two devices are integrated into the same electronic apparatus and are capable of providing functions of generating the color barcode certificate and verifying the color barcode certificate. However, in another exemplary embodiment, the two devices may independently exist to provide said functions, respectively, which should not be construed as a limitation to the disclosure.

Figure 8:
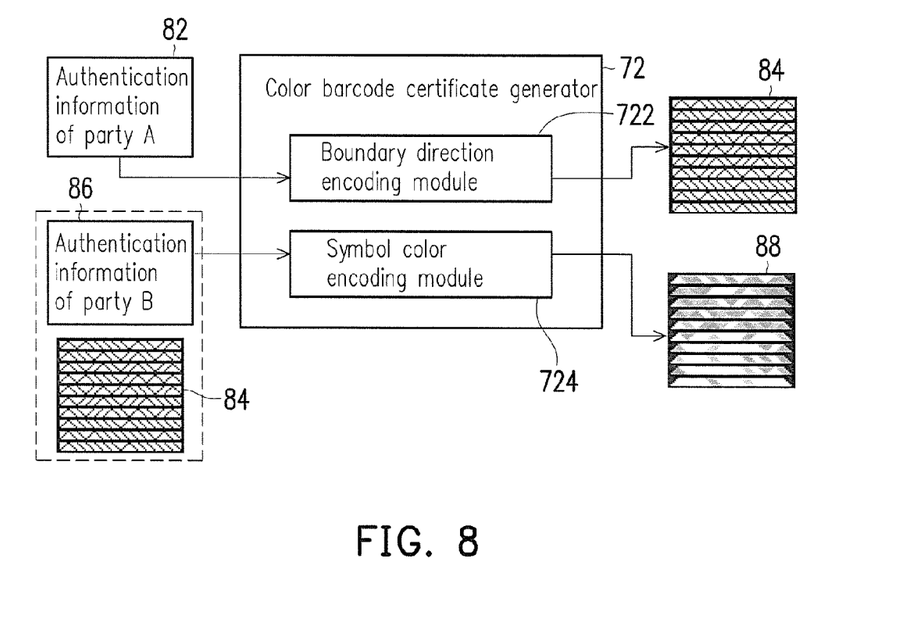
FIG. 8 schematically illustrates a color barcode certificate generator according to an exemplary embodiment of the disclosure.

FIG. 8 schematically illustrates a color barcode certificate generator according to an exemplary embodiment of the disclosure. With reference to FIG. 8, the color barcode generator 72 includes a boundary direction encoding module 722 and a symbol color encoding module 724. The input of the boundary direction encoding module 722 refers to the authentication information 82 of the party A, and the output of the boundary direction encoding module 722 refers to the barcode certificate sample 84 with the direction information of boundaries but without the color information. The input of the symbol color encoding module 724 refers to the authentication information 86 of the party B and the barcode certificate sample 84 with the direction information of boundaries but without the color information, and the output of the symbol color encoding module 724 refers to the color barcode certificate 88.

Figure 9:
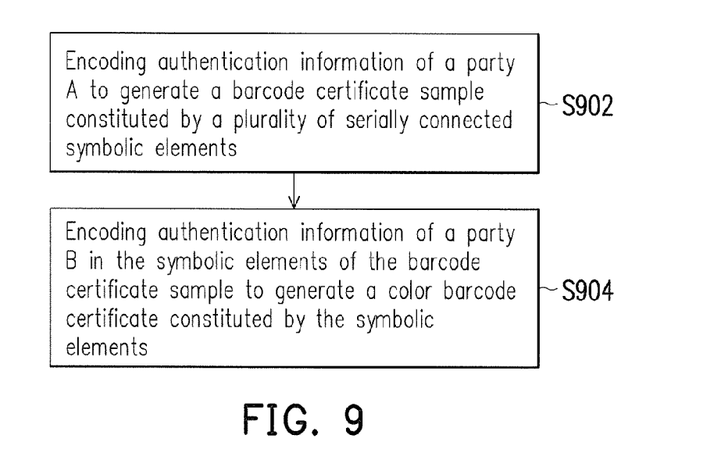
FIG. 9 is a flowchart illustrating a method for generating a color barcode according to an exemplary embodiment of the disclosure.

To be specific, FIG. 9 is a flowchart illustrating a method for generating a color barcode according to an exemplary embodiment of the disclosure. With reference to FIG. 7, FIG. 8, and FIG. 9, the method provided herein is applicable to the color barcode verification system 70 shown in FIG. 7 and the color barcode certificate generator 72 shown in FIG. 8, and the detailed steps of the method for generating the color barcode are explained hereinafter with reference to various components in the color barcode certificate generator 72.

In step S902, the boundary direction encoding module 722 encodes the authentication information of the party A to generate the barcode certificate sample constituted by a plurality of serially connected symbolic elements. Each of the symbolic elements is one of triangles and parallelograms, and the authentication information is recorded in the direction information of the boundaries among the symbolic elements. The boundary direction encoding module 722 converts the authentication information of the party A into binary to generate the barcode certificate sample according to the boundary direction encoding method provided in the previous exemplary embodiments, such that the direction information of the boundaries in the barcode certificate sample records the authentication information of the party A.

It is noted that the authentication information of the party A may include one or a combination of the confidential information of the party A, the error correction code, and the padding information for padding the insufficient length (or the assistant information), which should however not be construed as a limitation to the disclosure. Particularly, before the barcode certificate sample is generated, the color barcode verification system 70 may generate the authentication information of the party A by a first authentication information generating module (not shown). The first authentication information generating module encrypts a first serial number (i.e., the certification number) with use of a first key through conventional symmetrical encryption algorithms, such as data encryption standard (DES), 3DES, or advanced encryption standard (AES), so as to generate the confidential information of the party A. If the number of storable bits of the direction information of boundaries in the barcode certificate sample is greater than the number of bits of the confidential information of the party A, the first authentication information generating module pads the confidential information of the party A with zeros until the number of storable bits of the direction information is identical to the number of bits of the confidential information of the party A. The first authentication information generating module generates the error correction code of the confidential information of the party A based on the fault-tolerance rate of the encoding step according to the direction information of the boundaries. The padded confidential information, the error correction code, and the padding information (or the assistant information) are serially connected to generate the authentication information of the party A.

Figure 10:
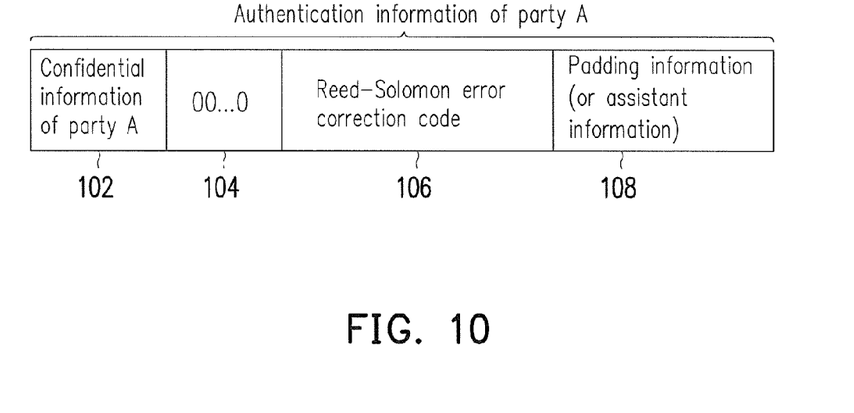
FIG. 10 illustrates exemplary authentication information of a party A according to an exemplary embodiment of the disclosure.
Figure 11:
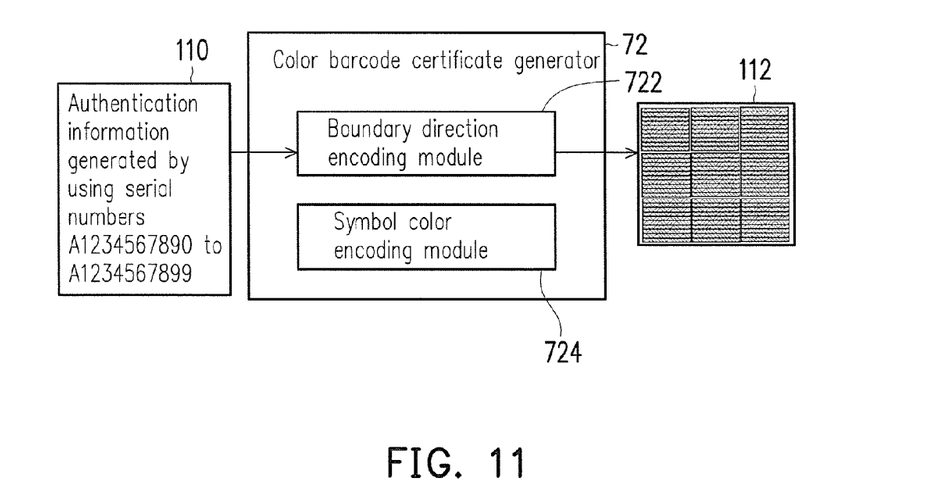
FIG. 11 illustrates an example of generating a barcode certificate sample according to an exemplary embodiment of the disclosure.

FIG. 10 illustrates exemplary authentication information of a party A according to an exemplary embodiment of the disclosure. With reference to FIG. 10, the authentication information of the party A described in the present exemplary embodiment includes the confidential information 102 of the party A, the padded confidential information 104 of the party A, the error correction code generated by means of the Reed-Solomon Code, and the padding information (or the assistant information) 108. FIG. 11 illustrates an example of generating a barcode certificate sample according to an exemplary embodiment of the disclosure. With reference to FIG. 11, in the present exemplary embodiment, the authentication information 110 generated by the serial numbers A1234567890 to A1234567899 are input to the color barcode certificate generator 72, and the boundary direction encoding module 722 generates the barcode certificate sample 112 merely containing the direction information of the boundaries but without the color information. The barcode certificate sample 112 is sent to the party B together with the certificate number, the description, and the expiration date, to facilitate generating and issuing the color barcode certificate for party B.

In the steps shown in FIG. 9, while the party B issues the color barcode certificate, the symbol color encoding module 724 encodes the authentication information of the party B in the symbolic elements of the barcode certificate sample to generate the color barcode certificate constituted by the symbolic elements (step S904) wherein the colors of the adjacent symbolic elements in the color barcode certificate are different, and the authentication information of the party B is recorded in the color information of the symbolic elements.

It should be mentioned that the authentication information of the party B may include one or a combination of the non-confidential information of the party B, the confidential information of the party B, the error correction code, and the padding information, which should however not be construed as a limitation to the disclosure. Particularly, before the color barcode certificate is generated, the color barcode verification system 70 may generate the authentication information of the party B by a second authentication information generating module (not shown). The second authentication information generating module may first generate the non-confidential information of the party B (e.g., the description of the certificate, the expiration date thereof, and the store issuing the certificate) and the confidential information of the party B, for instance. The length of the confidential information of the party B is determined by the length of the digital signature, and the confidential information is generated by encrypting the second serial number with use of a second key through asymmetrical encryption algorithms, such as Rivest-Shamir-Adleman (RSA) encryption, or elliptic curve encryption. If the number of storable bits of the color information in the color barcode certificate is greater than the number of bits of the confidential information of the party B, the second authentication information generating module pads the confidential information of the party B with zeros until the number of storable bits of the color information is identical to the number of bits of the confidential information of the party B. The second authentication information generating module generates the error correction code of the confidential information of the party B based on the fault-tolerance rate of the encoding step according to the color. The non-confidential information of the party B, the padded confidential information, the error correction code, and the padding information are serially connected to generate the authentication information of the party B.

Besides, in an exemplary embodiment of the disclosure, while the party B encodes the authentication information, the number of colors to be used in the color barcode certificate may be input to the color barcode certificate generator 72, such that the symbol color encoding module 724 may thereby generate the required number of colors to be used in the color barcode certificate. According to another exemplary embodiment, the symbol color encoding module 724 may spontaneously determine the number of colors of the symbolic elements in the color barcode certificate according to the length of the authentication information received by the symbol color encoding module 724. The relationship between the number of storable bits of the color information in the color barcode certificate and the number of used colors is expressed by the aforesaid equation (2) and thus will not be further explained hereinafter.

Figure 12:
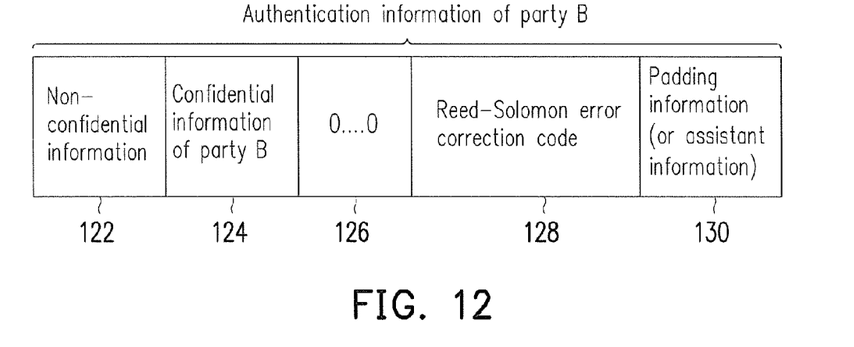
FIG. 12 illustrates exemplary authentication information of a party B according to an exemplary embodiment of the disclosure.
Figure 13:
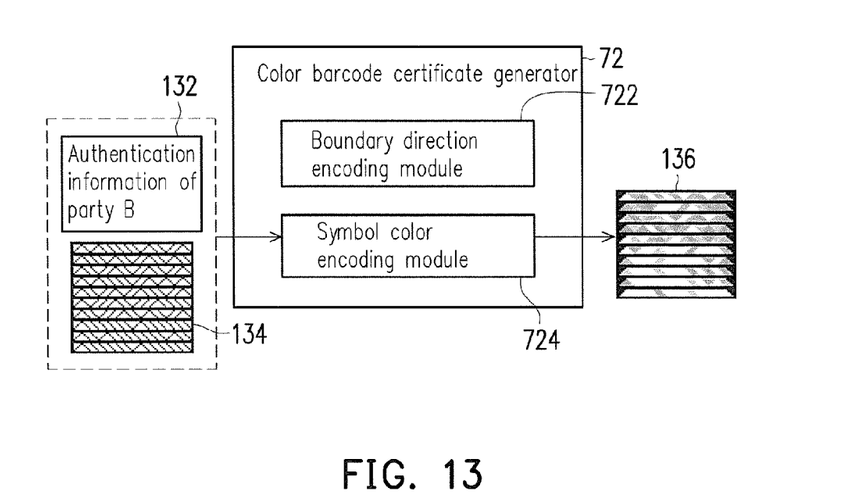
FIG. 13 illustrates an example of generating a color barcode certificate according to an exemplary embodiment of the disclosure.

FIG. 12 illustrates exemplary authentication information of a party B according to an exemplary embodiment of the disclosure. With reference to FIG. 12, the authentication information of the party B described in the present exemplary embodiment includes the non-confidential information 122, the confidential information 124 of the party B, the padded confidential information 126 of the party B, the error correction code 128 generated by means of the Reed-Solomon Code, and the padding information (or the assistant information) 130. FIG. 13 illustrates an example of generating a color barcode certificate according to an exemplary embodiment of the disclosure. With reference to FIG. 13, in the present exemplary embodiment, the authentication information 132 of the party B and the barcode certificate sample 134 that has the serial number A123456789 and merely contains the direction information of the boundaries are input to the color barcode certificate generator 72, and the symbol color encoding module 724 then generates the color barcode certificate 136. The resultant color barcode certificate 136 may be issued to the consumers for use by the party B.

In light of the foregoing, consumers are able to obtain the color barcode certificates for exchanging items from the stores of the party B and then exchange the certificates with the items in the stores of the party A. At this time, the stores of the party A need to verify the color barcode certificates to confirm the validity of the color barcode certificates and the identity of the holders. In response thereto, a mechanism for verifying the color barcode certificate is provided in the following exemplary embodiment.

Figure 14:
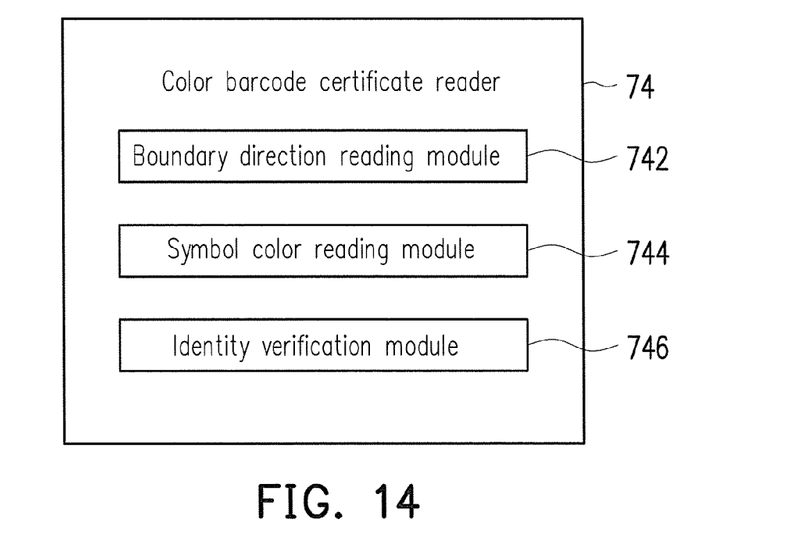
FIG. 14 is a block view illustrating a color barcode certificate reader according to an exemplary embodiment of the disclosure.
Figure 15:
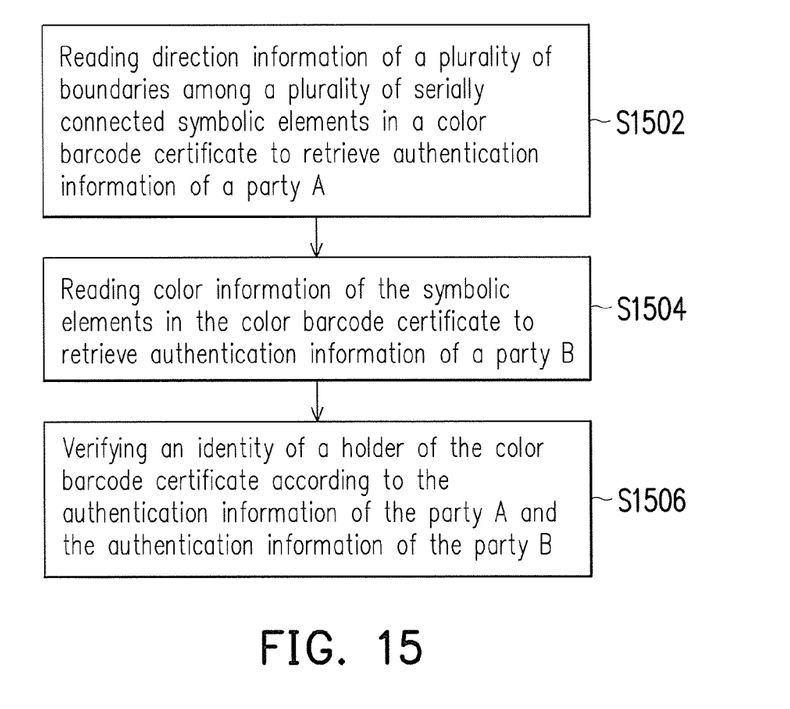
FIG. 15 is a flowchart illustrating a method for verifying a color barcode according to an exemplary embodiment of the disclosure.

FIG. 14 is a block view illustrating a color barcode certificate reader according to an exemplary embodiment of the disclosure. FIG. 15 is a flowchart illustrating a method for verifying a color barcode according to an exemplary embodiment of the disclosure. With reference to FIG. 7, FIG. 14, and FIG. 15, the method for verifying the color barcode described in the present exemplary embodiment is applicable to the color barcode verification system 70 shown in FIG. 7 and the color barcode certificate reader 74 shown in FIG. 14. The color barcode certificate reader 74 includes a boundary direction reading module 742, a symbol color reading module 744, and an identity verification module 746. The detailed steps of the method for verifying the color barcode are described hereinafter with reference to the components of the color barcode certificate reader 74.

When a consumer holds a color barcode certificate generated by the color barcode certificate generator 72 and asks the party A to verify the color barcode certificate, the party A may put the color barcode certificate in the color barcode certificate reader 74, such that the boundary direction reading module 742 reads the direction information of the boundaries among the serially connected symbolic elements in the color barcode certificate to retrieve the authentication information of the party A (step S1502). Each of the symbolic elements is one of triangles and parallelograms, and colors of the adjacent symbolic elements are different. The encoding step based on the direction information is already described above, and the boundary direction reading module 742 provided in the present exemplary embodiment performs the decoding step in a reverse manner with respect to aforesaid exemplary embodiment. Therefore, no further descriptions in this regard are provided hereinafter.

While the boundary direction reading module 742 reads the color barcode certificate, the symbol color reading module 744 reads the color information of the symbolic elements in the color barcode certificate to retrieve the authentication information of the party B (step S1504). The encoding step based on the color information is also described above, and the symbol color reading module 744 provided in the present exemplary embodiment performs the decoding step in a reverse manner with respect to aforesaid exemplary embodiment. Therefore, no further descriptions in this regard are provided hereinafter.

The identity verification module 746 verifies the identity of the holder of the color barcode certificate according to the authentication information of the party A decoded by the boundary direction reading module 742 and the authentication information of the party B decoded by the symbol color reading module 744 (step S1506). To be specific, the identity verification module 746 may decrypt the authentication information of the party A with use of the first key to obtain the first serial number, searches a database with use of the first serial number to obtain a description and an expiration date of the color barcode certificate, reads the non-confidential information of the party B recorded in the authentication information of the party B, and checks the description, the expiration date, and the non-confidential information to verify the color barcode certificate. The identity verification module 746 may further read the confidential information of the party B recorded in the authentication information of the party B, decrypts the confidential information of the party B with use of the second key to obtain the second serial number and a digital signature of the party B, and verifies the color barcode certificate and the identity of the holder of the color barcode certificate according to the second serial number and the digital signature.

To sum up, in the method, the apparatus, and the system for generating and verifying the color barcode provided herein, the color barcode certificate simultaneously containing the authentication information of two allied parties in different business sectors and the assistant information may be generated, such that the coupons or certificates used in exchange of the same product are applicable in a number of allied stores. Moreover, since the two allied parties respectively employ independent encoding systems, it is not necessary to ask a third party to assist in establishing the common protocol for data storage.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A method for verifying a color barcode, the method comprising:
   reading direction information of a plurality of boundaries among a plurality of serially connected symbolic elements in a color barcode certificate to retrieve first authentication information of a first party by an electronic apparatus, wherein each of the symbolic elements is one of at least two polygons, and colors of adjacent symbolic elements of the symbolic elements are different;
   reading color information of the symbolic elements to retrieve second authentication information of a second party by the electronic apparatus; and
   verifying an identity of a holder of the color barcode certificate according to the first authentication information and the second authentication information by the electronic apparatus.

2. The method for verifying the color barcode as recited in claim 1, wherein the step of verifying the identity of the holder of the color barcode certificate according to the first authentication information and the second authentication information comprises:
   decrypting the first authentication information with use of a first key to obtain a first serial number;
   searching a database with use of the first serial number to obtain a description and an expiration date of the color barcode certificate;
   reading non-confidential information of the second party recorded in the second authentication information; and
   checking the description, the expiration date, and the non-confidential information to verify the color barcode certificate.

3. The method for verifying the color barcode as recited in claim 2, wherein the step of verifying the identity of the holder of the color barcode certificate according to the first authentication information and the second authentication information further comprises:
   reading confidential information of the second party recorded in the second authentication information;
   decrypting the confidential information with use of a second key to obtain a second serial number and a digital signature of the second party; and
   verifying the color barcode certificate and the identity of the holder of the color barcode certificate according to the second serial number and the digital signature.

4. The method for verifying the color barcode as recited in claim 1, wherein the color barcode certificate comprises a plurality of symbolic element rows, and the symbolic element rows respectively comprises the serially connected symbolic elements and are separated from one another by a separation line.

5. The method for verifying the color barcode as recited in claim 1, wherein the polygons comprise parallelograms and triangles.

6. The method for verifying the color barcode as recited in claim 1, wherein the first authentication information comprises one or a combination of confidential information of the first party, an error correction code, padding information, and assistant information.

7. The method for verifying the color barcode as recited in claim 1, wherein the second authentication information comprises one or a combination of non-confidential information of the second party, confidential information of the second party, an error correction code, and padding information.

8. A method for generating a color barcode, the method comprising:
    encoding first authentication information of a first party to generate a barcode certificate sample constituted of a plurality of serially connected symbolic elements by an electronic apparatus, wherein each of the symbolic elements is one of at least two polygons, and the first authentication information is recorded in direction information of a plurality of boundaries among the symbolic elements in a color barcode certificate; and
    encoding second authentication information of a second party in the symbolic elements of the barcode certificate sample to generate the color barcode certificate constituted of the symbolic elements by the electronic apparatus, wherein colors of adjacent symbolic elements of the symbolic elements are different, and the second authentication information is recorded in color information of the symbolic elements.

9. The method for generating the color barcode as recited in claim 8, before the step of encoding the first authentication information of the first party to generate the barcode certificate sample constituted by the serially connected symbolic elements, the method further comprising:
    encrypting a first serial number with use of a first key to generate confidential information of the first party;
    padding the confidential information with zeros, such that a number of bits of the padded confidential information complies with a number of storable bits of the direction information;
    generating an error correction code of the confidential information according to a first fault-tolerance rate; and
    serially connecting the padded confidential information, the error correction code, and padding information or assistant information to generate the first authentication information.

10. The method for generating the color barcode as recited in claim 8, wherein the step of encoding the first authentication information of the first party to generate the barcode certificate sample constituted by the serially connected symbolic elements comprises:
    converting the first authentication information into binary and generating the barcode certificate sample to record the converted first authentication information in the direction information of the boundaries in the barcode certificate sample.

11. The method for generating the color barcode as recited in claim 8, before the step of encoding the second authentication information of the second party in the symbolic elements of the barcode certificate sample to generate the color barcode certificate constituted by the symbolic elements, the method further comprising:
    encrypting a second serial number and a digital signature with use of a second key to generate confidential information of the second party;
    padding the confidential information with zeros, such that a number of bits of the padded confidential information complies with a number of storable bits of the color information;
    generating an error correction code of the confidential information according to a second fault-tolerance rate; and
    serially connecting a non-confidential information, the padded confidential information, the error correction code, and padding information to generate the second authentication information.

12. The method for generating the color barcode as recited in claim 8, wherein the step of encoding the second authentication information of the second party in the symbolic elements of the barcode certificate sample to generate the color barcode certificate constituted by the symbolic elements comprises:
    determining a number of colors used by the symbolic elements according to a length of the second authentication information.

13. A color barcode generator comprising:
    a boundary direction encoding module, encoding first authentication information of a first party to generate a barcode certificate sample constituted by a plurality of serially connected symbolic elements, wherein each of the symbolic elements is one of at least two polygons, and the first authentication information is recorded in direction information of a plurality of boundaries among the symbolic elements; and
    a symbol color encoding module, encoding second authentication information of a second party in the symbolic elements of the barcode certificate sample to generate a color barcode certificate constituted by the symbolic elements, wherein colors of adjacent symbolic elements of the symbolic elements are different, and the second authentication information is recorded in color information of the symbolic elements.

14. The color barcode generator as recited in claim 13, further comprising:
    a first authentication information generating module, encrypting a first serial number with use of a first key to generate confidential information of the first party, padding the confidential information with zeros, such that a number of bits of the padded confidential information complies with a number of storable bits of the direction information, generating an error correction code of the confidential information according to a first fault-tolerance rate, and serially connecting the padded confidential information, the error correction code, and padding information or assistant information to generate the first authentication information.

15. The color barcode generator as recited in claim 14, wherein the boundary direction encoding module converts the first authentication information into binary and generates the barcode certificate sample to record the first authentication information in the direction information of the boundaries in the barcode certificate sample.

16. The color barcode generator as recited in claim 13, further comprising:
    a second authentication information generating module, encrypting a second serial number and a digital signature with use of a second key to generate confidential information of the second party, padding the confidential information with zeros, such that a number of bits of the padded confidential information complies with a number of storable bits of the color information, generating an error correction code of the confidential information according to a second fault-tolerance rate, and serially connecting a non-confidential information, the padded confidential information, the error correction code, and padding information to generate the second authentication information.

17. The color barcode generator as recited in claim 16, wherein the symbol color encoding module determines the number of colors used by the symbolic elements according to a length of the second authentication information.

18. A color barcode reader comprising:
- a boundary direction reading module, reading direction information of a plurality of boundaries among a plurality of serially connected symbolic elements in a color barcode certificate to retrieve first authentication information of a first party, wherein each of the symbolic elements is one of at least two polygons;
- a symbol color reading module, reading color information of the symbolic elements to retrieve second authentication information of a second party; and
- an identity verification module, verifying an identity of a holder of the color barcode certificate according to the first authentication information and the second authentication information.

19. The color barcode reader as recited in claim 18, wherein the identity verification module further decrypts the first authentication information with use of a first key to obtain a first serial number, searches a database with use of the first serial number to obtain a description and an expiration date of the color barcode certificate, reads non-confidential information of the second party recorded in the second authentication information, and checks the description, the expiration date, and the non-confidential information to verify the color barcode certificate.

20. The color barcode reader as recited in claim 18, wherein the identity verification module further reads confidential information of the second party recorded in the second authentication information, decrypts the confidential information with use of a second key to obtain a second serial number and a digital signature of the second party, and verifies the color barcode certificate and the identity of the holder of the color barcode certificate according to the second serial number and the digital signature.

21. A color barcode verification system comprising:
a color barcode generator comprising:
- a boundary direction encoding module, encoding first authentication information of a first party to generate a barcode certificate sample constituted by a plurality of serially connected symbolic elements, wherein each of the symbolic elements is one of at least two polygons, and the first authentication information is recorded in direction information of a plurality of boundaries among the symbolic elements in a color barcode certificate; and
- a symbol color encoding module, encoding second authentication information of a second party in the symbolic elements of the barcode certificate sample to generate the color barcode certificate constituted by the symbolic elements, wherein colors of adjacent symbolic elements of the symbolic elements are different, and the second authentication information is recorded in color information of the symbolic elements; and a color barcode reader comprising:
- a boundary direction reading module, reading the direction information of the boundaries among the serially connected symbolic elements in the color barcode certificate to retrieve the first authentication information of the first party;
- a symbol color reading module, reading the color information of the symbolic elements to retrieve the second authentication information of the second party; and
- an identity verification module, verifying an identity of a holder of the color barcode certificate according to the first authentication information and the second authentication information.

* * * * *